United States Patent [19]

Edwards

[11] Patent Number: 4,740,688
[45] Date of Patent: Apr. 26, 1988

[54] OPTICAL TRANSDUCERS WITH WAVELENGTH CODING

[75] Inventor: Roger A. Edwards, Cheltenham, England

[73] Assignee: Smiths Industries Public Limited Company, London, England

[21] Appl. No.: 25,115

[22] Filed: Mar. 12, 1987

[30] Foreign Application Priority Data

Mar. 20, 1986 [GB] United Kingdom ............... 8606855
May 17, 1986 [GB] United Kingdom ............... 8612049

[51] Int. Cl.⁴ ............................................. G01J 3/50
[52] U.S. Cl. ............................... 250/226; 250/227; 250/231 SE
[58] Field of Search ............ 250/226, 227, 231 SE, 250/237 G; 340/347 D; 356/395

[56] References Cited

U.S. PATENT DOCUMENTS

| | | | |
|---|---|---|---|
| 3,482,105 | 12/1969 | Hutzler | 250/226 |
| 4,045,667 | 8/1977 | Hanson | 250/227 |
| 4,223,216 | 9/1980 | Quick et al. | 250/226 |
| 4,334,152 | 6/1982 | Dakin et al. | 250/226 |
| 4,517,456 | 5/1985 | Halsall et al. | 250/227 |

Primary Examiner—David C. Nelms
Attorney, Agent, or Firm—Pollock, Vande Sande and Priddy

[57] ABSTRACT

An optical transducer has an optical head mounted above an optically encoded reflective disc. Broad band radiation is supplied to the head via a single fibre cable. This head is a solid glass block with a curved reflecting surface that collimates and reflects radiation onto a diffraction grating. Radiation is dispersed by the grating and reflected back onto the curved reflecting surface. This causes the radiation to be focussed onto the disc as a spectrum. The head combines radiation reflected from the disc and focusses it onto the end of an output fibre. A wavelength decoder at the other end of the output fibre disperses the received radiation so that an array of photodiodes provides an output representing the location of the reflective parts of the disc from which the position of the disc is determined. By measuring the separation between two reflective tracks concentricity errors can be removed and displacement of an encoder in two coordinate directions can be measured by measuring the separation and absolute positions of reflected wavelengths.

11 Claims, 3 Drawing Sheets

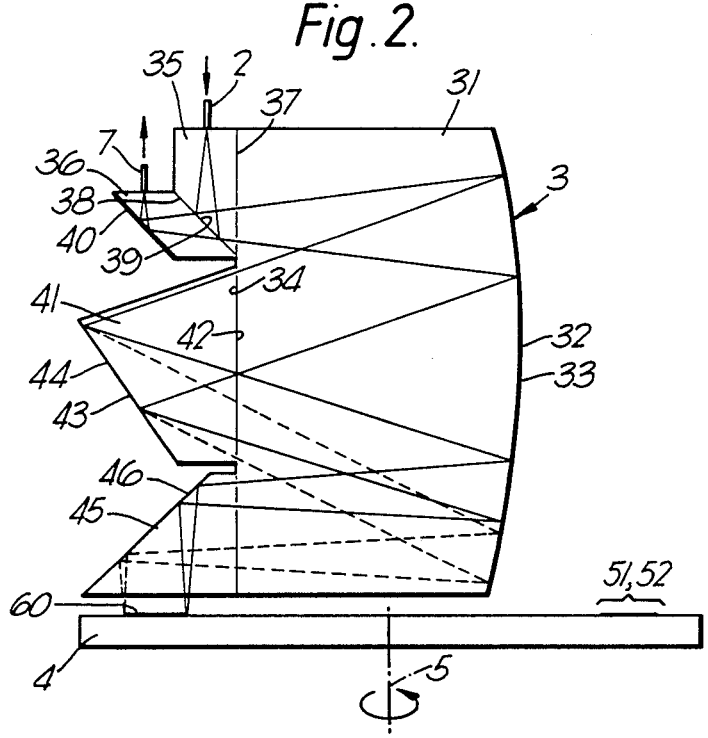
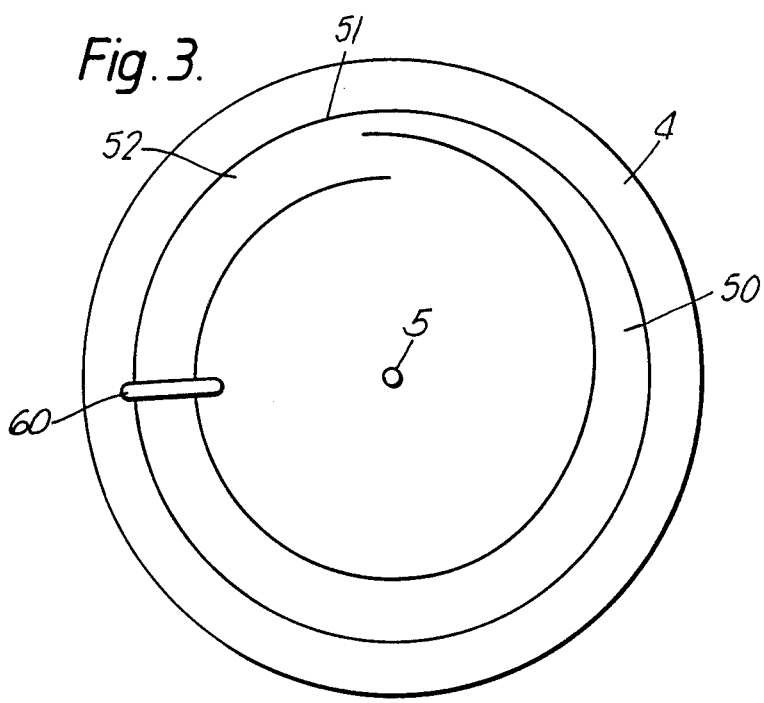

OPTICAL TRANSDUCERS WITH WAVELENGTH CODING

BACKGROUND OF THE INVENTION

This invention relates to optical transducers.

Optical displacement transducers are well known and generally employ a light source and receiver (such as provided by the ends of fibre-optic cables), and means to vary the amount of radiation falling on the receiver in accordance with displacement. The means by which the radiation is varied may employ a moveable mask with an aperture of variable size, or a neutral density filter the density of which varies along its direction of displacement. These transducers can function satisfactorily providing that the intensity of radiation falling on the receiver is not varied for any other reason. However, any change in the radiation emitted by the light source, such as, for example, caused by variations in power supply to the light source will produce erroneous displacement readings.

The effect of these variations in light intensity can be reduced by instead modulating the spectral content of the radiation in accordance with displacement. However, a problem with previous transducers of this kind is that it can be difficult to achieve a linear output since devices for producing spectral dispersion are not linear, and because wavelength decoders usually do not present a linear output response.

In another arrangement light is dispersed into its spectral components and a coded mask is moved within the spectrum to allow different parts of the spectrum to be transmittd according to the position of the mask. The radiation passed by the mask is focussed on one end of a fibre-optic cable and is dispersed again at the other end of the cable. By measuring the intensity of radiation at different parts of the spectra it is possible to determine the position of the mask. The problem, however, with such an arrangement is that it is difficult to ensure that all the radiation transmitted through the mask is focussed on the end of the receiving fibre, because the image formed will be spread over the image plane by virtue of the dispersed nature of the spectrum imaged on the mask. There is also a problem in that, in some circumstances it may not be possible to use a transparent mask where access is required to both sides of the mask.

BRIEF SUMMARY OF THE INVENTION

It is an object of the present invention to provide an optical transducer that can be used to alleviate the above-mentioned problems.

According to one aspect of the present invention there is provided an optical transducer including a source of optical radiation over a range of wavelengths, an optical head that is arranged to disperse the radiation into its component wavelengths along a region so that the wavelength of the radiation emitted by the optical head at any location along the region is dependent on the location along the region, and a displaceable member that is movable relative to the region in the path of the radiation, the displaceable member being optically encoded such that different wavelength radiation is reflected back to the optical head according to the position of the displaceable member, the optical head being arranged to deflect the reflected radiation according to its wavelength such that it is imaged on the end of a radiation gude, and the radiation guide extending to detector means that is arranged to respond to radiation at different wavelengths and thereby provide an output in accordance with the position of the displaceable member.

The optical head preferably includes a different element that is arranged to disperse the radiation into its component wavelengths and to deflect radiation reflected via the displaceable member onto the radiation guide. The diffraction element may be a diffraction grating. The optical head preferably includes a converging reflective surface arranged to collimate and reflect radiation towards the diffraction element, to focus radiation on the displaceable member and to focus radiation from the displaceable member on the end of the radiation guide. The transducer may include a first radiation guide arranged to supply radiation from the source to the optical head and a second separate radiation guide arranged to supply radiation from the optical head to the detector. The first radiation guide is preferably a single fibre, fibre-optic cable. The second radiation guide may be a single fibre, fibre-optic cable. The optical head may be provided by a solid block of an optically-transparent material. The displaceable member may have reflective markings on a non-reflective background.

The displaceable member may be an analogue encoder, having two reflective tracks the separation of which varies according to the position of the encoder, the detector being arranged to respond to to the separation between the wavelengths reflected by the two tracks and to provide an output in accordance therewith. The displaceable member may be a rotatable disc, one reflective track being circular and centered on the axis of rotation of the disc, and the other track being spiral. The displaceable member may be movable in two directions at an angle to each other, the detector being arranged to respond to both the separation between the reflected wavelengths and the absolute value of the wavelengths and to provide an output in accordance with the position of the displaceable member along both directions. The displaceable member may be digitally encoded. The detector means may include an array of photodetectors, each photodetector being responsive to radiation reflected from a different part of the region.

An optical transducer in accordance with the present invention will now be described, by way of example, with reference to the accompanying drawings.

BRIEF DESCRIPTION OF THE DRAWINGS

FIG. 2 is a side elevation view of the optical head of the transducer;

FIG. 3 is a plan view of the displaceable encoder member used with the transducer;

DETAILED DESCRIPTION

Figure 1:
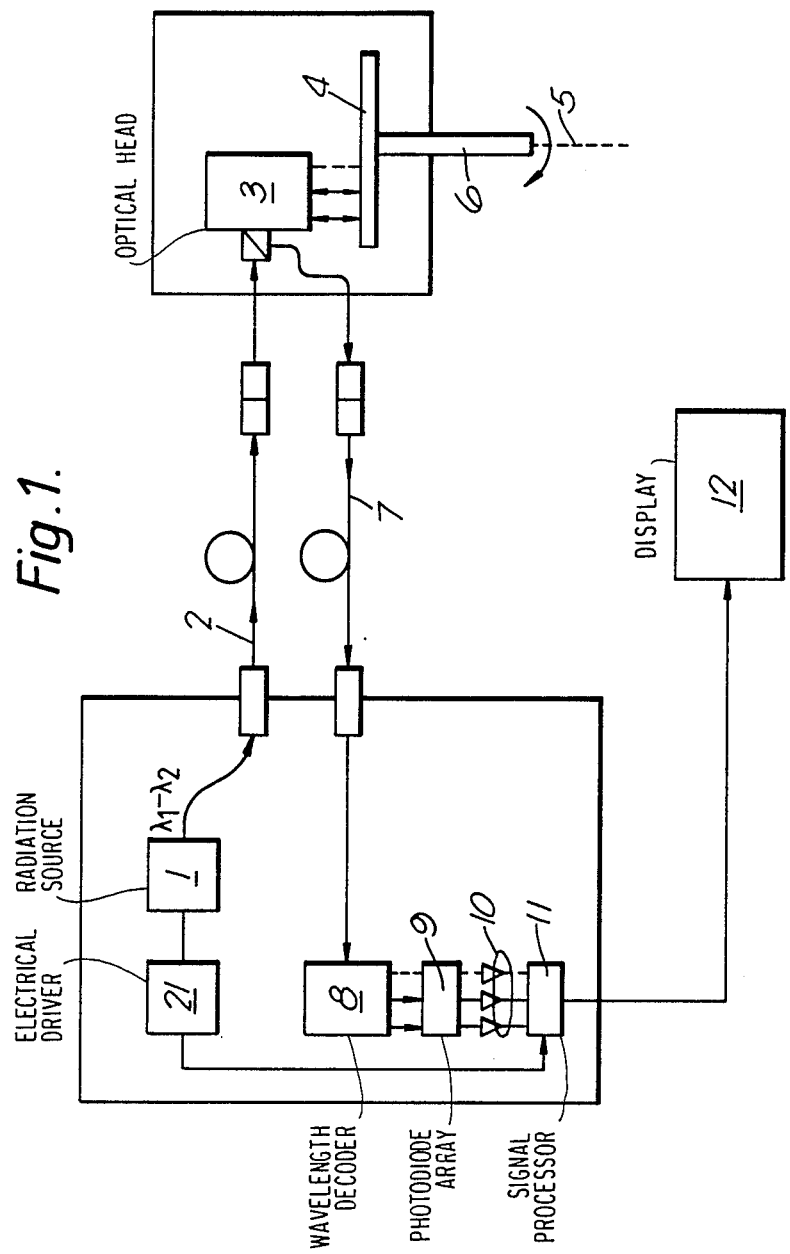
FIG. 1 is a schematic diagram of the transducer.

With reference to FIG. 1, the optical tranducer includes a radiation source 1 of a range of wavelengths $\lambda_1$ to $\lambda_2$ provided by a light-emitting diode or other source, such as a tungsten lamp, and an electrical driver 21. Radiation from the source 1 is supplied via a first radiation guide, i.e., a single fibre, fibre-optic cable 2 to an optical head 3, which will be described in greater detail below. The optical head 3 disperses the radiation into its component spectrum and directs this onto an encoder disc 4 that is rotated about its axis 5 in accordance with changes in an input variable. In this respect, the input variable could, for example, be derived from a pressure or temperature sensor coupled to rotate an input shaft 6 of the encoder disc 4.

The encoder disc 4 reflects different parts of the spectrum back to the optical head 3 according to the position of the encoder disc. This reflected radiation is combined together in the optical head 3 and supplied to one end of a second radiation guide, i.e., a single fibre, fibre optic cable 7. The return cable 7 has its other end connected with a wavelength decoder 8 which disperses the radiation returned by the cable into its component wavelengths. The decoder 8 may include any conventional form of dispersion device such as a grating or prism. The spectrum formed by the decoder 8 is focussed on a linear array 9 of photodiodes or similar devices which provides output signals on lines 10 representative of the intensity of radiation at different parts of the spectrum. Because there will not usually be only one photodiode that is illuminated, but a spread over several photodiodes, a signal processor 11 is used to identify the peak illumination. The output from the signal processor 11 is supplied to a display device 12 on which is provided a display representation of the position of the encoder disc 4 which may be scaled to indicate directly the variable being monitored e.g. pressure or temperature. Alternatively, the output may be supplied to other utilization means such as, for example, effects control in accordance with the measured variable.

If white light of sufficient intensity is used, some of the modified light may be split off and used to illuminate a point on a control panel. Such means would give a simple, direct indication of the state of a variable. For example, since red is at one end of the visible spectrum, this color could indicate a dangerously high pressure, while green could indicate a safe pressure.

The optical head 3 will now be described in greater detail with reference to FIG. 2. The optical head 3 is a solid glass block formed from several different glass elements joined to one another, although other optically transparent material could be used. The major part of the head 3 is provided by a generally rectangular collimating block 31 which has a spherical converging surface 32 on which is deposited a reflective coating 33. The opposite surface 34 of the collimating clock 31 is planar and supports the other components of the optical head. These include two prismatic elements 35 and 36, joined to the upper end of the plane surface 34, by which radiation enters and leaves the head. The input element 35 has a plane surface 37, which abuts the plane surface 34 of the collimating block, and an inclined lower surface 38 which reflects input radiation into the collimating block 31 and which allows radiation emerging from the collimating block to pass into the output element 36. The output element 36 is of parallelepiped shape, one face 39 of which abuts the inclined face 38 of the input element 35. The opposite face 40 is coated with a reflective material and reflects radiation to the return fibre 7.

Mounted on the plane surface 34, below the input and output elements 35 and 36, is a diffraction element 41. The diffraction element 41 is a glass block with a plane forward face 42, that abuts the collimating block 31, and an inclined rear face 43 on which is coated a reflective diffraction grating 44.

At the lower end of the plane surface 34 of the collimating block 31, there is mounted a prism element 45 with an inclined rear face 46 which is reflectively coated and which reflects radiation emerging from the collimating block 31 downwardly onto the encoder disc 4. Similarly, radiation reflected by the encoder disc 4 is reflected by the rear face 46 into the collimating block 31.

Following the radiation path through the optical head 3, it can be seen that radiation from the input fibre 2 enters the head in a vertical, downwards direction and that this radiation will be divergent. The surface 38 reflects the radiation, to the right, in the drawing, generally horizontally towards the reflective collimating surface 32. The curvature of the collimating surface 32 is such that it produces a parallel reflected beam of radiation that is directed to the left through the block 31 and onto the diffraction grating 44. The grating 44 produces dispersion of the incident radiation into its component spectrum to produce a reflected beam that is spread between the solid and broken lines in the drawing. The dispersed radiation is directed back onto the collimating surface 32 which converges the incident radiation and directs it back, to the left, to the prism element 45. The radiation is reflected downwardly by the rear face 46 of the prism 45 and is focussed onto the surface of the encoder disc 4. The radiation is therefore dispersed into its component wavelengths in a spectrum 60 that extends along a region arranged radially of the disc 4.

Radiation reflected from the encoder disc 4 follows the same path back through the optical head 3 to the diffraction grating 44. The radiation reflected from the encoder disc 4 onto the diffraction grating 44 will be deflected at an angle dependent on the wavelength of the radiation. After reflection by the coverging surface 32, the radiation reaches the inclined surface 38 of the input block 35. The rear surface 38 of the input block 35 and the forward surface 39 of the output block 36 function together as a beam splitting surface so that a proportion of the radiation reflected from the encoder disc 4 is transmitted by the surfaces 38 and 39 to the reflecting face 40 where the radiation is reflected to the return fibre 7. The grating 44 ensures that all radiation reflected by the encoder disc is imaged at the same point on the end of the return fibre 7.

It can be seen that, by using the optical head 3, radiation is dispersed prior to being imaged on the encoder disc 4 and that those wavelengths reflected by the reflective tracks on the encoder disc are recombined by the grating 44. In this way, the small diameter object formed by the end of the input fibre 2 is spread out along the spectrum 60 on the encoder disc 4 and the reflected radiation is combined and focussed back to a small diameter image on the end of the return fibre 7. The image focussed on the end of the return fibre 7 is therefore the same size as the end of the input fibre 2, thereby ensuring a maximum efficiency when the return fibre 7 is of the same diameter as that of the input fibre 2.

By using a reflective encoder, the same optical head is used to disperse and combine, thereby avoiding the need to provide a separate combiner with the additional expense and size that this would involve. Also, by using a reflective encoder, there is no need to have access behind the encoder. This enables encoding markings to be provided on an opaque member such as a flywheel.

Because the collimating surface 32, the grating 44 and the reflecting surfaces 38, 45 and 40 are all provided on a solid block, the risk of relative movement between the surfaces on vibration is reduced.

It would be possible to use the same fibre cable to supply and receive radiation. However, if connectors are included in the cable, there is the risk that reflection will occur at the connectors and that some input radiation will be supplied to the decoder making it difficult to distinguish from reflected radiation.

One form of encoder disc 4 is shown in FIG. 3. This has a non-reflective background 50 and reflective markings in the form of tracks 51 and 52. The outer track 51 is circular with its center on the axis 5 of the disc. The inner track 52 has a spiral shape so that the distance between the two tracks 51 and 52 varies around the disc 4. The spectrum formed on the disc 4 is indicated by the region 60 which extends radially across both tracks. As the disc is rotated, different parts of the spectrum will be reflected back to the optical head 3 from the spiral track 52. The circular track 51, will reflect back radiation from the same part of the spectrum, assuming that the track is formed concentrically. However, by measuring the distance between the two tracks, as in the present arrangment, the transducer is insensitive to concentricity errors in the encoder disc.

Alternatively, the encoder disc could be digitally encoded such as using the Gray coded system.

Figure 4:
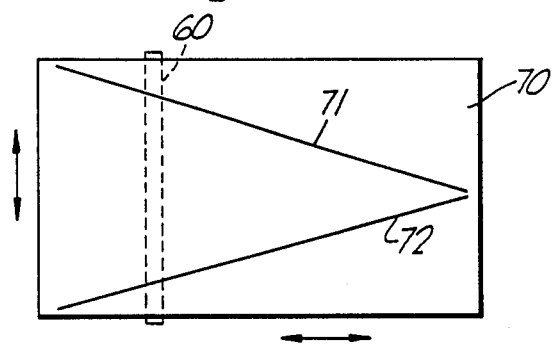
FIG. 4 is a plan view of an alternative encoder member.

The encoder need not be in the form of a rotatable disc, as described above, but could be a plate that is movable along its length. One form of such a plate 70 is shown in FIG. 4 which has two reflective tracks 71 and 72 that extend along its length. The tracks 71 and 72 are inclined towards one another across the width of the plate 70 so that their separation varies along its length.

Figure 4A:
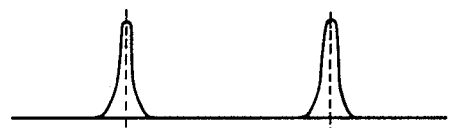
FIGS. 4A, 4B and 4C illustrate an output response for different positions of the alternative encoder member.
Figure 4B:
Figure 4C:

With this form of plate it is possible to measure both movement of the plate along its length and at right angles across its width. FIG. 4A shows the output response of the photodiode array 9 for the plate 70 in the position, with respect to the imaged spectrum 60, shown in FIG. 4. If the plate 70 is moved to the left, the separation between those parts of the tracks 71 and 72 on which the spectrum 60 is imaged becomes less, and the output peaks of the response therefore come closer together, as shown in FIG. 4B. If, however, the plate 70 is moved across its width, without displacement along its length, the separation between the peaks in the response will remain unchanged, but their absolute position will change, as shown in FIG. 4C. By monitoring the absolute position of these peaks it is therefore possible to monitor displacement of the plate in two coordinate directions.

I claim:

1. An optical transducer comprising: a source of optical radiation, said source being arranged to emit radiation over a range of wavelengths; an optical head; means to supply radiation from said source to said optical head, said optical head including means to disperse the radiation from said source into its component wavelengths along a region so that the wavelength of radiation at any location along the region is dependent on the location along the region; a displaceable member, said displaceable member being movable relative to the said region in the path of radiation, said displaceable member being optically encoded such that different wavelength radiation is reflected back to the optical head according to the position of the displaceable member; radiation detector means, said radiation detector means being responsive to radiation at different wavelengths; and a radiation guide extending from the optical head to the radiation detector means, the optical head including means to deflect the reflected radiation according to its wavelength such that it is imaged on the end of the radiation guide and thereby supplied to the radiation detector, said radiation detector providing an output in accordance with the position of the displaceable member.

2. An optical transducer according to claim 1, wherein the said means for dispersing the radiation from the source and the said means to deflect the reflected radiation from the displaceable member are both provided by the same diffraction element.

3. An optical transducer according to claim 2, wherein the diffraction element is a diffraction grating.

4. An optical transducer according to claim 2, wherein the said optical head includes a converging reflective surface, and wherein said converging reflective surface is located to collimate and reflect radiation towards the diffraction element, to focus radiation from the diffraction element on the displaceable member and to focus the radiation from the optical encoding on the displaceable member onto the end of the radiation guide.

5. An optical transducer according to claim 1, wherein the said means to supply radiation from said source to said optical head includes a single fibre, fibre-optic cable.

6. An optical transducer according to claim 1, wherein the said optical head is provided by a solid block of an optically-transparent material.

7. An optical transducer according to claim 1, wherein the said displaceable member is an analogue encoder, said analogue encoder having two reflective tracks the separation of which varies according to the position of the encoder, and wherein the said radiation detector means is arranged to respond to the separation between the wavelengths reflected by the two tracks and to provide the said output in accordance with said separation.

8. An optical transducer according to claim 7, wherein the said displaceable member is movable in two directions at right angles to each other, and wherein the said radiation detector means is arranged to respond to both the separation between the reflected wavelengths and the absolute value of the wavelengths, such that the said output is in accordance with the position of the displaceable member along both directions.

9. An optical transducer according to claim 7, wherein the said displaceable member is a rotatable disc, wherein one of said reflective tracks is circular and centred on an axis of rotation of the disc, and wherein the other of said tracks is spiral.

10. An optical transducer comprising: a source of optical radiation, said source being arranged to emit radiation over a range of wavelengths; an optical head in the form of a block of optically-transparent material; a first fibre-optic cable, said first fibre-optic cable extending between said source and said optical head such that radiation is supplied from said source to said optical head, the optical head including a converging reflective surface and a reflective diffraction grating on a surface of said block opposite to said converging reflective surface, said converging reflective surface collimating and directing radiation from said first fibre-optic cable onto said diffraction grating, said diffraction grating dispersing radiation incident on it into its component wavelengths and directing the dispersed radiation onto the said converging reflective surface, said converging reflecting surface reflecting and focussing the dispersed radiation to form an elongate spectrum; a displaceable member movable relative to said spectrum, said displaceable member being optically encoded with reflective markings that reflect back to the optical head radiation from different parts of the spectrum according to the position of the displaceable member, said diffraction grating deflecting the reflected radiation according to its wavelength; a seocnd fibre-optic cable, said second fibre-optic cable being located to receive the reflected radiation via said diffraction grating; radiation detector means, said radiation detector means being located to receive radiation from said second fibre-optic cable, and said radiation detector means being responsive to radiation at different wavelengths to provide an output in accordance therewith that is representative of the position of the displaceable member.

11. An optical transducer comprising; a source of optical radiation, said source being arranged to emit radiation over a range of wavelengths; an optical head; means to supply radiation from said source to said optical head, said optical head including means to disperse the radiation from said source into its component wavelengths along a region so that the wavelength of radiation at any location along the region is dependent on the location along the region; a displaceable member, said displaceable member being movable in two directions at an angle to each other, first and second optical tracks on said displaceable member the separation of which varies along said region, in one of said directions; radiation detector means, said radiation detector means being responsive to radiation at different wavelengths; and a radiation guide extending to said detector means, said radiation guide being arranged to supply radiation from both said tracks to said detector means and said radiation detector means responding to the separation between wavelengths from respective tracks and the absolute value of the wavelengths such as to provide an output in accordance with the position of the displaceable member along both directions.

* * * * *